(12) United States Patent
Covaro et al.

(10) Patent No.: US 8,415,900 B2
(45) Date of Patent: Apr. 9, 2013

(54) COLOR AND POSITION AUTO-COMMISSIONING

(75) Inventors: Mark Covaro, Sonoma, CA (US); Nathanael A. Ramella, Santa Cruz, CA (US)

(73) Assignee: Redwood Systems, Inc., Fremont, CA (US)

( * ) Notice: Subject to any disclaimer, the term of this patent is extended or adjusted under 35 U.S.C. 154(b) by 466 days.

(21) Appl. No.: 12/884,980

(22) Filed: Sep. 17, 2010

(65) Prior Publication Data

US 2012/0068608 A1    Mar. 22, 2012

(51) Int. Cl.
*G05F 1/00*    (2006.01)

(52) U.S. Cl. ........................................ 315/307; 315/312

(58) Field of Classification Search ............... 315/185 R, 315/192, 291, 294, 297, 307, 308, 312
See application file for complete search history.

(56) References Cited

U.S. PATENT DOCUMENTS

| | | | | |
|---|---|---|---|---|
| 5,446,342 | A | 8/1995 | Nilssen | 315/129 |
| 6,888,633 | B2 | 5/2005 | Vander Jagt et al. | 356/407 |
| 7,014,336 | B1 | 3/2006 | Ducharme et al. | 362/231 |
| 7,178,941 | B2 | 2/2007 | Roberge et al. | 362/225 |
| 7,387,405 | B2 | 6/2008 | Ducharme et al. | 362/231 |
| 7,520,634 | B2 | 4/2009 | Ducharme et al. | 362/276 |
| 7,689,130 | B2 | 3/2010 | Ashdown | 398/172 |
| 7,919,937 | B2 | 4/2011 | Tracy et al. | 315/307 |
| 8,008,613 | B2 | 8/2011 | Tam | 250/226 |
| 2004/0105264 | A1 | 6/2004 | Spero | 362/276 |
| 2005/0110416 | A1 | 5/2005 | Veskovic | 315/149 |
| 2009/0284747 | A1 | 11/2009 | Valois | 356/448 |
| 2010/0019686 | A1 * | 1/2010 | Gutierrez, Jr. | 315/291 |
| 2010/0026614 | A1 | 2/2010 | Blackwell et al. | 345/82 |
| 2010/0084992 | A1 | 4/2010 | Valois et al. | 315/291 |
| 2010/0214082 | A1 | 8/2010 | Covaro et al. | 340/310.12 |
| 2010/0301776 | A1 * | 12/2010 | Feri et al. | 315/312 |
| 2010/0315010 | A1 | 12/2010 | Damink et al. | 315/152 |

(Continued)

OTHER PUBLICATIONS

Feng, Chuan, Yang, Lizhi, Rozenblit, Jerzy W., Beudert, Peter, Design of a Wireless Sensor Network Based Automatic Light Controller in Theater Arts, 2007, pp. 1-7, IEEE.

(Continued)

*Primary Examiner* — Douglas W Owens
*Assistant Examiner* — Jianzi Chen
(74) *Attorney, Agent, or Firm* — Brinks Hofer Gilson & Lione

(57) ABSTRACT

A system for auto-commissioning a light fixture may position the light fixture based on sensor data received from at least one sensor. In order to focus the light fixture on a target location, the system may vary the position of the light fixture and determine a position of the light fixture where the light level received by the photosensor reaches a determined light level. The system may adjust a light characteristic of light emitted by the light fixture so that the color of light received by the photosensor at the target location matches a target light characteristic, such as color or intensity. The system may determine a focus position and a light characteristic for multiple target locations. The system may auto-commission multiple light fixtures.

20 Claims, 6 Drawing Sheets

U.S. PATENT DOCUMENTS

| | | |
|---|---|---|
| 2011/0031897 A1 | 2/2011 | Henig et al. ............... 315/297 |
| 2011/0076024 A1 | 3/2011 | Damink ............... 398/130 |
| 2011/0089842 A1* | 4/2011 | Aldrich et al. ............ 315/152 |
| 2011/0156596 A1 | 6/2011 | Salsbury ............... 315/152 |
| 2011/0180687 A1 | 7/2011 | Rains, Jr. et al. ........... 250/205 |
| 2011/0199004 A1 | 8/2011 | Henig et al. ............ 315/152 |
| 2011/0199020 A1 | 8/2011 | Henig et al. ............ 315/294 |
| 2011/0202151 A1 | 8/2011 | Covaro et al. ............ 700/90 |
| 2011/0273114 A1* | 11/2011 | Ogg et al. ............ 315/312 |

OTHER PUBLICATIONS

U.S. Appl. No. 12/538,806, filed Aug. 10, 2009, Henig et al.
U.S. Appl. No. 12/708,460, filed Feb. 18, 2010, Henig et al.
U.S. Appl. No. 13/328,313, filed Dec. 16, 2011, Barilleaux.

* cited by examiner

COLOR AND POSITION AUTO-COMMISSIONING

BACKGROUND

1. Technical Field

This application relates to light fixtures and, in particular, to auto-commissioning light fixtures.

2. Related Art

Actors moving around on a stage in a theater may be illuminated by controlling the orientation of lighting devices. The color of light generated by lighting devices may be set to a desired color so that actors or any other object is illuminated by colored light.

SUMMARY

A system for auto-commissioning a light fixture may be provided that includes a photosensor, a sensor module, a light fixture module, and an auto-commission module. The photosensor may be positioned at a target location that receives light generated by the light fixture. The sensor module may receive a light level detected at the photosensor. The light fixture module may cause a variation in a position of the light fixture. The auto-commission module may be in communication with the sensor module and the light fixture module and determine a focus position of the light fixture at which the light level detected at the photosensor reaches a determined light level. The auto-commission module may associate the focus position of the light fixture with the target location in a calibration table. The system may adjust a light characteristic of light emitted by the light fixture so that the color of light received by the photosensor at the target location matches a target light characteristic, such as color or intensity.

A tangible non-transitory computer-readable medium encoded with computer executable instructions may be provided that includes a sensor module, a light fixture module, and an auto-commission module. The sensor module may receive a light level detected at photosensors located at multiple target locations. The light fixture module may selectively cause a variation in position of each one of the light fixtures. The auto-commission module, which may be in communication with the sensor module and the light fixture module, may determine a focus position for each one of the light fixtures based on a determination that a determined light level is detected at each one of the photosensors.

A computer-implemented method for auto-commissioning a light fixture may be provided. A light level detected at a photosensor may be received, where the photosensor is located at a target location. The light level detected at the photosensor may be varied by causing a change in position of the light fixture. A focus position of the light fixture may be determined at which the light level detected at the photosensor reaches a determined light level. The light fixture may be focused on the target location by directing the light fixture to move into the focus position.

Further objects and advantages of the present invention will be apparent from the following description, reference being made to the accompanying drawings wherein preferred embodiments of the present invention are shown.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
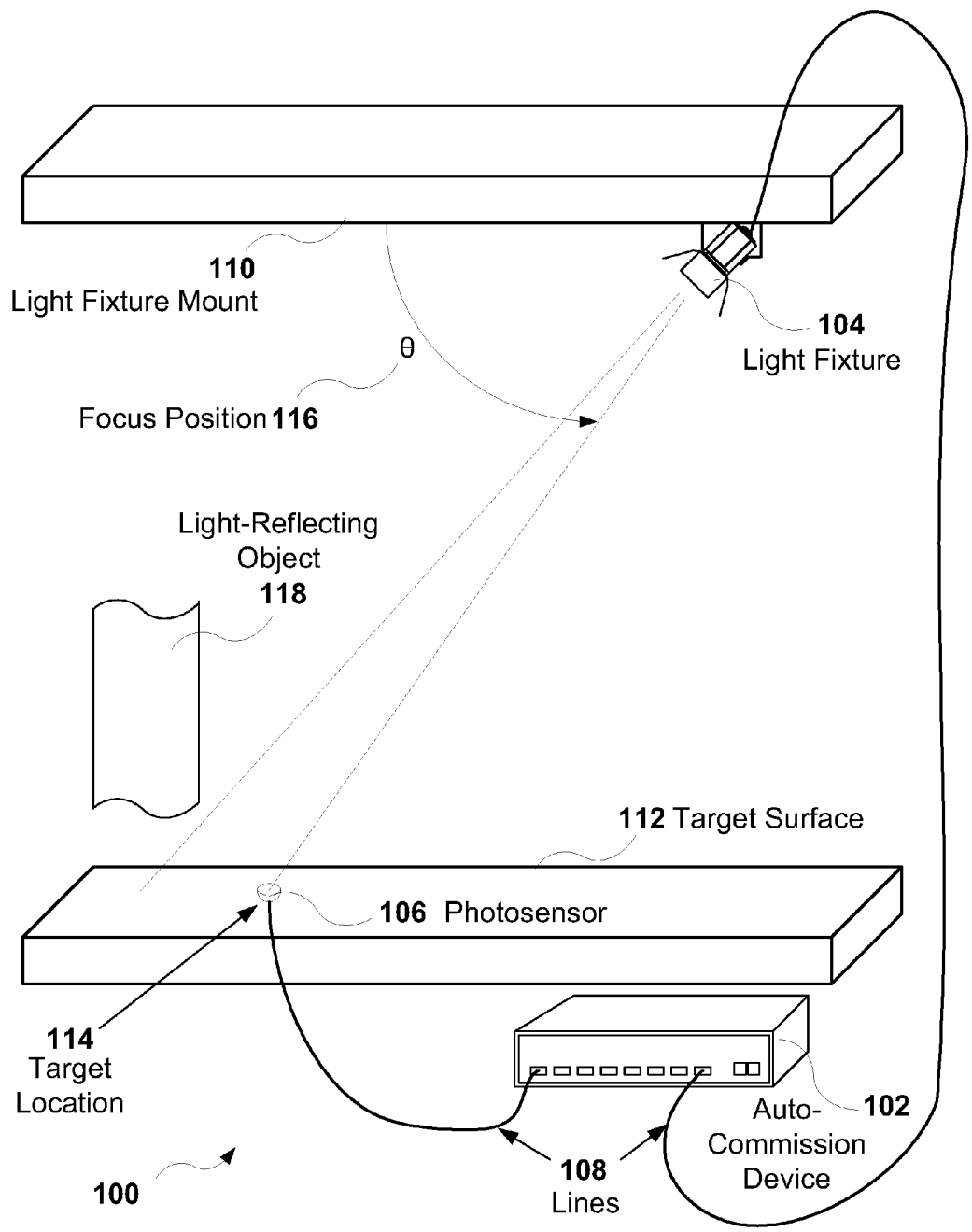
FIG. 1 illustrates an example of a system for color and position auto-commissioning of light fixtures.

A system may position light fixtures and build one or more matrices of color, intensity, and positions for a particular venue and light arrangement. The lighting may be artistic, architectural, theatrical, or any other type of lighting. The system may automatically focus on and illuminate target locations with a particular color, intensity, or any other detectable light characteristics, while adjusting the position or light characteristic in order to compensate for variations in lighting setup or ambient conditions.

The matrices of color, intensity, and positions may be determined prior to, for example, a theatrical performance. The matrices may be used during the performance. Alternatively or in addition, the system may automatically focus on and illuminate target locations with a target light characteristic during the performance.

The system may position light fixtures with photosensors. Each one of the light fixtures may include a motor or an actuator that controls the direction of the light fixture or otherwise moves the light fixture. Alternatively or in addition, a motor or an actuator may control the direction of a group of light fixtures. The system may receive light levels detected at one or more photosensors located at a target location. The system may repeatedly change the position of a light fixture. For example, the system may incrementally rotate the light fixture. In response, the system may detect variations in the light levels detected at the photosensor. The system may determine a focus position of the light fixture at which the light level detected at the photosensor reaches a determined light level, such as a maximum light level. The light fixture may be focused on the target location when positioned in the focus position. The focus position may include, for example, swivel and tilt values, and the target position may be coordinates in a spherical coordinate system, a polar coordinate system, a Cartesian coordinate system, or any other type of coordinate system.

The location of the photosensor may be moved to a new target location. Alternatively or in addition, a second photosensor may be located at the new target location. The system may repeat the process of varying the position of the light fixture and determining a new target position of the light fixture at which the light fixture focuses on new target location. The system may repeat the process any number of times and create a mapping between focus positions of the light fixture and target locations. The mapping may be a matrix of focus positions and target locations. The system may extrapolate from the mapping in order to determine how to position the light fixture to focus on any particular location. Alternatively or in addition, the system may track the photosensor as it moves by continually directing the light fixture on the photosensor.

Alternatively or in addition, the system may control the light characteristics of light generated by light fixtures so that a target location is lit with a particular light characteristic or a particular set of light characteristics. The light characteristics may include, for example, color, intensity, or a combination thereof. Color may be set for a particular position on a stage or other area to be lit. Ambient conditions may affect the light in an illuminated area. For example, including a black background instead of a white background may change the color of the light at a location if the light from the light fixtures remains unchanged. The system may receive sensor data from the photosensor that indicates a detected light characteristic. The system may adjust the light emitted by the light fixture until the detected light characteristic matches a target light characteristic. Thus, the system may generate light at any target location that has any target light characteristic.

FIG. 1 illustrates an example of a system 100 for color and position auto-commissioning of light fixtures. The system 100 may include an auto-commission device 102, a light fixture 104, and a photosensor 106. The system 100 may include additional, fewer, or different elements. For example, the system 100 may include multiple light fixtures, multiple photosensors 106, and multiple auto-commission devices 102. Multiple auto-commission devices may facilitate scaling up to auto-commissioning more light fixtures. For example, any one of the auto-commission devices may communicate with the other auto-commission devices and auto-commission light fixtures that are in communication with any of the auto-commission devices.

The light fixture 104 may be any electrical device or combination of devices that creates artificial light from electricity. The light fixture 104 may distribute, filter or transform the light from one or more lamps included in the light fixture 104. For example, the light fixture 104 may include reflectors, optics, such as a lens, or any combination thereof. The lamps may include an incandescent bulb, a LED (Light-emitting Diode) light, a fluorescent light, a CFL (compact fluorescent lamp), a CCFL (Compact Fluorescent Lamp), or any other device now known or later discovered that generates artificial light. In one example, lamps in the light fixture 104 may include a lamp that generates red light, a lamp that generates green light, and a lamp that generates blue light, so that the light fixture 104 may generate a target color from a combination of the light generated by the respective lamps. The light fixture 104 may include a stage lighting fixture, an architectural lighting fixture, a studio lighting fixture, or any other type of light fixture. Examples of the light fixture 104 include an ellipsoidal light, a Fresnel light, a parabolic aluminized reflector lamp (PAR light), border lights, a spot light, or any other device that includes one or more lamps. In one example, the light fixture 104 may include an additional light source, such as an infrared LED. The photosensor 106 may include, for example, an infrared detector. The additional light source may provide a more focused beam of light than the light fixture 104. Alternatively or in addition, light from the additional light source may not be visible to the human eye. Consequently, the system 100 may auto-commission the light fixture 104 without producing visible light.

Additionally, the light fixture 104 may include any number of motors or actuators that adjust the position of the light fixture 104. For example, actuators may tilt and/or swivel the light fixture 104. Alternatively or in addition, motors may move the light fixture 104 along an axis, such as, along a horizontal axis. Alternatively or in addition, a device coupled to light fixture 104 may adjust the position of the light fixture 104. For example, a PAR mover may be coupled to the light fixture 104, such that the PAR mover pans and tilts the light fixture 104. In another example, the light fixture 104 may include an aperture control that varies the width of a beam of light that emanates from the light fixture 104.

Alternatively or in addition, the light fixture 104 may include inputs for adjusting light characteristics of one or more lamps in the light fixture 104. For example, the amount of power delivered to the light fixture 104 may determine the intensity (brightness) of the light generated by the light fixture 104. The light fixture 104 may include multiple inputs, each corresponding to a colored lamp in the light fixture 104. The amount of power delivered to the inputs corresponding to different colored lamps, such as red, green, and blue lamps, may determine the overall color of the light. Alternatively or in addition, the light fixture 104 may include inputs that receive instructions that comply with a proprietary of standard protocol, such as Ethernet, TCP/IP, or DMX512, which is an industry standard communications protocol for digital communication networks developed by the Engineering Commission of United States Institute for Theatre Technology (USITT).

In one example, the light fixture 104 may include, or be electrically coupled to, an AC/DC converter to convert alternating current (AC) power to direct current (DC) in order to power the lamps. In a second example, the light fixture 104 may include an inverter that converts a DC power signal to AC to power the lamps. In a third example, the light fixture 104 may not include either the AC/DC converter or the inverter.

The photosensor 106 may include a device that detects one or more light characteristics, such as intensity and color, and represent the light characteristics as an electrical signal. Examples of the photosensor 106 include optical detectors, photoresistors, photodiodes, phototransistors and any other light detecting device.

The auto-commission device 102 may be one or more devices that determines how to position the light fixture 104 in order to illuminate a target position, how to illuminate the target position with a target light characteristic, or a combination of both. If the auto-commission device 102 includes multiple devices, the devices may coordinate activities using a communications protocol.

The auto-commission device 102 may be in communication with the light fixture 104 and the photosensor 106. For example, the auto-commission device 102 may communicate with the light fixture 104 and photosensor 106 over lines 108. The lines 108 may be twisted-pair wiring, building wiring, fiber optic cable, or any other type of wiring. In one example, the lines 108 may deliver power to the light fixture 104 and the photosensor 106 in addition to being a communication medium. In addition, the auto-commission device 102 may be in communication with other types of sensors that detect motion, range, ultrasound, audio, temperature, or any other physical characteristic.

The light fixture 104 may be mounted on a light fixture mount 110 and illuminate a target surface 112. The light fixture mount 110 may include any surface, such as a ceiling or a wall, or any apparatus, such as a rack or a stand. The target surface 112 may be the any surface, such as a stage floor, a retail display, a work space, or any other object or person, such as a theatre prop, a backdrop, scenery, a musical instrument, an art object, an actor, a musician, or industrial equipment.

During operation of the system 100, the photosensor 106 may be manually held or placed at a target location 114. For example, the photosensor 106 may be hand carried by an operator, located at the end of a boom. Alternatively, the photosensor 106 may be fixed at the target location 114. For example, the photosensor 106 may be fixed as part of a theatrical set.

The auto-commission device 102 may receive light levels detected at the photosensor 106 located at the target location 114. For example, the photosensor 106 may transmit the detected light levels to the auto-commission device 102 over the lines 108. While receiving the detected light levels, the auto-commission device 102 may repeatedly cause the light fixture 104 to change position. For example, the auto-commission device 102 may incrementally move the light fixture 104 along an axis. In response, the auto-commission device 102 may detect variations in the light levels detected at the photosensor 106. Accordingly, the auto-commission device 102 may determine what position of the light fixture 104 causes the detected light level to reach a determined light level. A position of the light fixture 104 at which the light from the light fixture illuminates the target location may be referred to as a focus position 116. When the light fixture is in the focus position, the detected light level may reach the determined light level. For example, the determined light level may be the maximum light level detected while the light fixture 104 changes position. Alternatively or in addition, the determined light level may be a threshold value, such as a sum of a predetermined amount and the detected light level when the light fixture 104 is turned off.

There may be multiple possible focus positions. For example, the light fixture 104 may generate a light beam that has a uniform intensity, or that has a darkened center. Therefore, the auto-commission device 102 may determine multiple focus positions. For example, if the light fixture 104 is positioned in any of the multiple focus positions, an edge of the beam illuminates the photosensor 106. In one example, auto-commission device 102 may select one of the focus positions and as the focus position 116. Alternatively or in addition, the auto-commission device 102 may derive the focus position 116, for example, determining the focus position 116 as the position in the middle of the focus positions. Alternatively or in addition, the auto-commission device 102 may associate multiple focus positions with the target location 114.

The auto-commission device 102 may use any number of mechanisms to identify the focus position 116. For example, auto-commission device 102 may sweep the light fixture 104 along a first axis and then incrementally move the light fixture 104 along a second axis, re-sweeping the light fixture 104 along the first axis for each incremental movement along the second axis. The auto-commission device 102 may determine a first coordinate along the first axis and determine a second coordinate along the second axis where the detected light level reaches the determined light level. The combination of the first coordinate and the second coordinate may identify the position of the light fixture 104 at which the light fixture 104 is focused on or directed at the target location 114. The first and second coordinates may be spherical coordinates, polar coordinates, Cartesian coordinates or any other type of coordinates. If the light fixture 104 may be moved in three dimensions, then the focus position 116 may include three coordinates. Alternatively, if the light fixture 104 may be moved in just one dimension, then the focus position 116 may include one coordinate.

Alternatively, instead of sweeping through the full range of motion along each axis, the auto-commission device 102 may determine the focus position 116 by positing the light fixture 104 at a starting point and moving the light fixture 104 in a direction that causes an increase in the detected light level until the detected light level ceases to increase if the light fixture 104 is moved any further.

The auto-commission device 102 may determine a change vector indicating the direction that causes the increase in the detected light level. The auto-commission device 102 may determine components of the change vector and then add the change vector to the starting point in order to determine a next point to move the light fixture 104. The auto-commission device 102 may move the light fixture 104 from the starting point in one direction along a first axis and measure the change in the detected light level. The auto-commission device 102 may move the light fixture 104 back to the starting point and then move the light fixture 104 in one direction along the second axis, again measuring the change in the detected light level. The changes in detected light levels may indicate the direction along each axis from the starting point that increases the detected light level. For example, if the change in detected light level increases as the light fixture 104 moves in one direction along an axis, then one component of the change vector will indicate to move in that direction along that axis from the starting point. In contrast, if the change in detected light level decreases as the light fixture 104 moves in that direction along an axis, then the auto-commission device 102 may move the light fixture 104 in the opposite direction along that axis from the starting point in order to verify that the change in detected light level increases when moving in the opposite direction along that axis. If so, then one component of the change vector will indicate to move in that opposite direction along that axis from the starting point. A second component of the change vector may be determined in the same way, but for the second axis instead of for the first axis. Accordingly, the auto-commission device 102 may adjust the position of the light fixture 104 from the starting point in a direction indicated by the change vector to the next point. The auto-commission device 102 may use the next point as a new starting point, and repeat until the detected light level decreases or stays the same in both directions along each of the axes.

Alternatively or in addition, the auto-commission device 102 may determine the focus position 116 from predetermined positions of the light fixture 104. For example, the predetermined positions may include points in a grid. The auto-commission device 102 may detect the light level at each of the predetermined positions of the light fixture 104. The auto-commission device 102 may determine which of the predetermined positions of the light fixture 104 reaches the determined light level at the target location 114. Accordingly, the focus position 116 or focus positions may be the predetermined position or predetermined positions where the detected light level exceeds the determined light level. Alternatively, the auto-commission device 102 may treat the predetermined position or predetermined positions as the starting point described above.

Alternatively or in addition, the auto-commission device 102 may move the light fixture on a predetermined path and determine the detected light level along the path. For example, the predetermined path may be a spiral pattern. The auto-commission device 102 may determine the focus position 116 as the position of the light fixture 104 along the predetermined path that causes the detected light level to reach the determined light level.

Alternatively of in addition, the auto-commission device 102 may search for the focus position 116 using a binary search. For example, the auto-commission device 102 may divide the area in which the light fixture 104 may be positioned into two areas. The auto-commission device 102 may move the light fixture 104 to a position in each of the two areas and detect the light level. The auto-commission device 102 may select the area that has the highest detected light level as the next area. The auto-commission device 102 may divide the next area into two areas, detect the light level in each of next two areas, and so on, repeating until the auto-commission device 102 finds the focus position 116.

After the auto-commission device 102 determines the focus position 116 for the target location 114, then the photosensor 106 may be moved to a second target location. Alternatively or in addition, a second photosensor may be located at the second target location. The auto-commission device 102 may determine the focus position 116 of the light fixture 104 for the second target position of the light fixture in the same way that the auto-commission device 102 determined the focus position 116 for the first target position 114. The auto-commission device 102 may repeat any number of times with multiple light fixtures, multiple target locations, or any combination thereof. The auto-commission device 102 may create a mapping between target locations and focus positions of the light fixtures. The mapping may be referred to as a calibration table. Table 1 below is an example of information in the calibration table.

TABLE 1

| Target Location | Focus Position | |
|---|---|---|
| | Polar Angle (θ) | Azimuthal Angle (φ) |
| Light Fixture 1: | | |
| Target Location 1 | 30 | 10 |
| Target Location 2 | 20 | 40 |
| Light Fixture 2: | | |
| Target Location 1 | −15 | 38 |
| Target Location 2 | −34 | 15 |

Using geometry, the auto-commission device 102 may extrapolate from the calibration table and determine how to position the light fixture 104 so that the light fixture 104 focuses on any arbitrary location. In the example of Table 1, in order to focus the light fixture 104 on a midpoint between target location 1 and target location 2, the auto-commission device 102 may set the position of the light fixture 104 to a midpoint between focus position 1 and focus position 2, which are mapped to target location 1 and target location 2, respectively.

If the location of the light fixture 104 and the target location 114 are known in a common three-dimensional coordinate system, then the auto-commission device 102 may determine the position of light fixture 104 that focuses the light fixture 104 on any particular point in the three-dimensional coordinate system from the calibration table.

As described above, the auto-commission device 102 may populate the calibration table by selecting the light fixture 104 from among multiple light fixtures and determining multiple focus positions corresponding to multiple target locations for the selected light fixture 104. Alternatively, the auto-commission device 102 may populate the calibration table by selecting the target location 114 from among multiple target locations and determining the focus positions of multiple light fixtures that correspond to the selected target location 114. The calibration table may include an m by n matrix, where m is the number of target locations (or fixed sensors if all of the sensors are fixed), and n is the number of light fixtures.

If the location of the light fixture 104 in the common three-dimensional coordinate system is not known, the auto-commission device 102 may determine the location of the light fixture 104 in that coordinate system. For example, the auto-commission device 102 may determine focus positions for two or more target locations in a common three-dimensional coordinate system. The auto-commission device 102 may determine the location of the light fixture 104 in the common three-dimensional coordinate system using triangulation.

Alternatively or in addition, the auto-commission device 102 may calibrate light characteristics of light generated by the light fixture 104. The light characteristics may include, color, intensity, generated heat, or any other light characteristic. The auto-commission device 102 may receive sensor data from the photosensor 106 that indicates a detected light characteristic. The auto-commission device 102 may adjust the light emitted by the light fixture 104 until the detected light characteristic matches a target light characteristic. The auto-commission device 102 may associate the adjusted light settings with the target light characteristic in the calibration table. Thus, the auto-commission device 102 may generate light at any target location having any target light characteristic.

The auto-commission device 102 may receive the target light characteristic from a user input device, such as a keyboard, a mouse, a touchpad, or any other user input device. For example, the target light characteristic may be specified as values corresponding to components of the RGB (red, green, and blue) color model, the PANTONE® color model, the CMYK (cyan, magenta, yellow, and key) color model, or any other color model. PANTONE is a registered trademark of Pantone, Inc.

Alternatively or in addition, the auto-commission device 102 may determine the target light characteristic. For example, an operator may manually control the color of the light generated by one or more light fixtures until the target color at the target location 114 is found by the operator. The auto-commission device 102 may receive the target light characteristic, such as the target color, from the photosensor 106 located at the target location 114.

In a second example, an operator may position the photosensor 106 next to a color swatch that is the color that the operator desires the light fixture 104 to produce. The auto-commission device 102 might direct the light fixture 104 to generate white light. The light reflected off of the color swatch may be the desired color. The photosensor 106 may detect the light reflected off of the color swatch. Therefore, the auto-commission device 102 may receive the target color from the photosensor 106. The operator may remove the color swatch and move the photosensor 106 to the target location 114. The auto-commission device 102 may direct the light fixture 104 to generate the target color. If the light detected at the photosensor 106 does not match the target color, then the auto-commission device 102 may adjust the color generated by the light fixture 104 until the light detected at the photosensor 106 matches the target color.

If a light-reflecting object 118, such as a curtain, is placed next to the photosensor 106, then the color of the light received at the target location 114 may change. The auto-commission device 102 may compensate for this change in color. If the light detected at the photosensor 106 does not match the target color, then auto-commission device 102 may adjust the color generated by the light fixture 104 until the light detected at the photosensor 106 matches the target color. In one example, the calibration table may include the target light characteristic or set of target light characteristics, such as a target color and a target intensity, associated with each one of the elements of the matrix.

Figure 2:
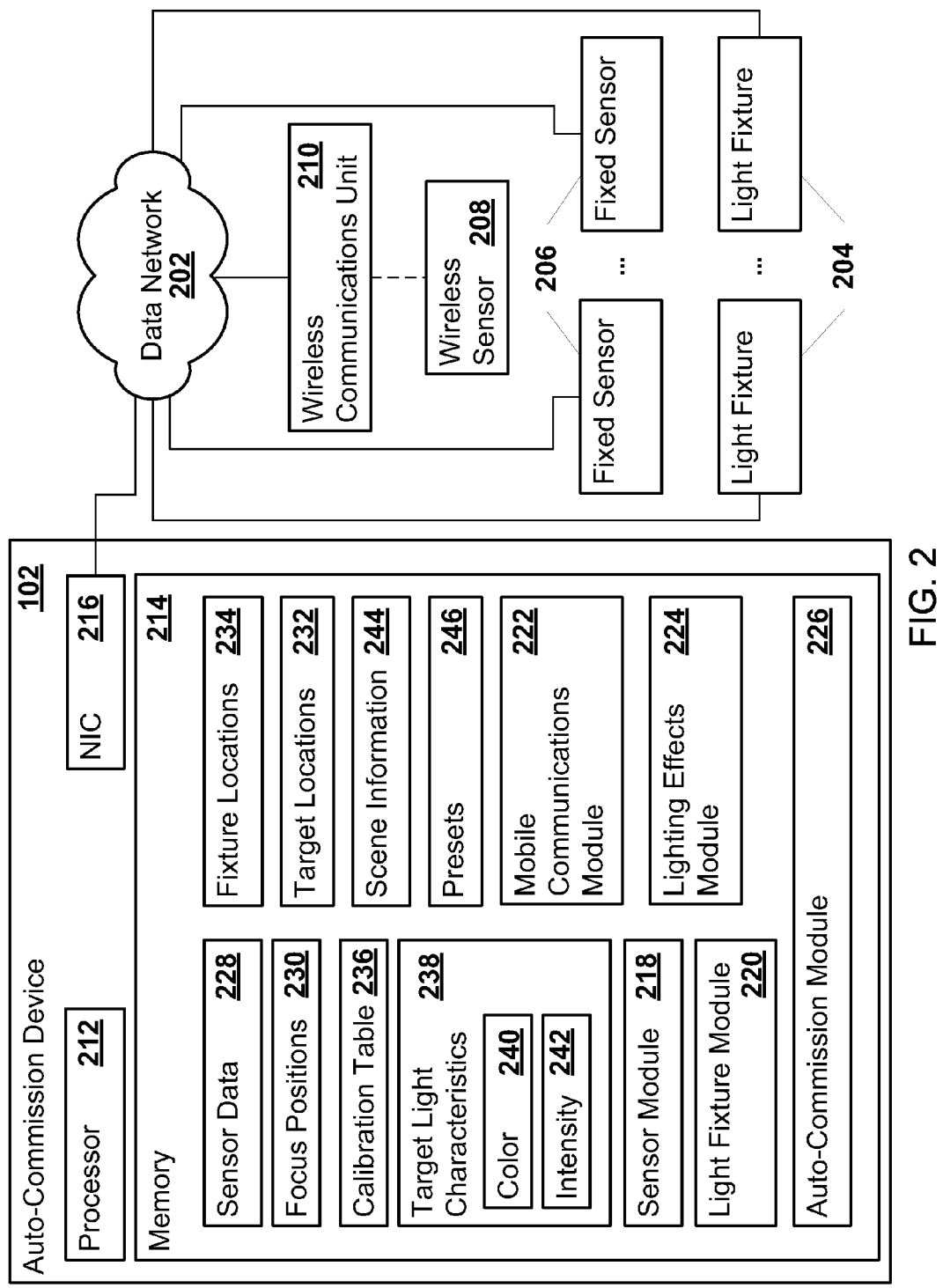
FIG. 2 illustrates a hardware diagram of an example of an auto-commission device and supporting entities.

FIG. 2 illustrates a hardware diagram of an example of the auto-commission device 102 and supporting entities, such as a data network 202, that may implement the system 100. In the example illustrated in FIG. 2, the system 100 includes, in addition to the auto-commission device 102 and the data network 202, light fixtures 204, fixed sensors 206, a wireless sensor 208, and a wireless communications unit 210. The system 100 may include additional, fewer, or different elements.

The light fixtures 204 may include any number of light fixtures. The light fixtures 204 may include any type of light fixture, such as the light fixture 104 illustrated in FIG. 1.

The fixed sensors 206 may include photosensors located in selected locations throughout the lighting area that is lit by the light fixtures 204. For example, the fixed sensors may be embedded in a set for a theatrical play. The fixed sensors 206 may include sensors that may be picked up and physically moved to a new location. The fixed sensors 206 may include any type of sensor, such as the photosensor 106 illustrated in FIG. 1.

The wireless sensor 208 may include a photosensor that operates wirelessly. For example, the wireless sensor 208 may be included in an application-specific wand device, in a PDA (personal digital assistant), a cell phone, a smart phone, or in any other mobile device. An operator may move the wireless sensor 208 from one target location to another. The system 100 may include multiple wireless sensors.

The wireless communications unit 210 may be a device that communicates wirelessly with the wireless sensor 208. Examples of the wireless communications unit 210 may include a wireless router, a IEEE 802.11 compliant base unit, and a BLUETOOTH® compliant wireless hub. BLUETOOTH® is a registered trademark owned by BLUETOOTH SIG, INC, a Delaware corporation. In the example illustrated in FIG. 2, the wireless communications unit 210 is a physically discrete device, separate from, and in communication with, the auto-commission device 102. Alternatively, the wireless communications unit 210 may be a unitary part of the auto-commission device 102.

The auto-commission device 102 may be in communication with the fixed sensors 206, the light fixtures 204, the wireless communications unit 210 and the wireless sensor 208 over the data network 202. The data network 202 may be a local area network (LAN), a wireless local area network (WLAN), a personal area network (PAN), a wide area network (WAN), the Internet, any other communications network, or any combination thereof. Alternatively, the auto-commission device 102 may be in communication with the light fixtures 204 and the fixed sensors 206 over lines, such as the lines 108 in the example illustrated in FIG. 1.

The auto-commission device 102 may include a processor 212, a memory 214, and a network interface controller 216. The auto-commission device 102 may include additional, fewer, or different components. For example, the auto-commission device 102 may include hardware that is electrically coupled to wiring over which the auto-commission device 102 communicates directly with the fixed sensors 206, such as in the example illustrated in FIG. 1.

The network interface controller (NIC) 216 may include hardware or a combination of hardware and software that enables communication over the data network 202. The NIC 216 may provide physical access to the data network 202 and provide a low-level addressing system through use of Media Access Control (MAC) addresses. The NIC 216 may include a network card that is installed inside a computer or other device, such as the auto-commission device 102. Alternatively, the NIC 216 may include an embedded component that is embedded in a circuit board in the auto-commission device 102, an expansion card, or in any other type of hardware.

The memory 214 may be any data storage device or combination of storage devices. Examples of the memory 214 include non-volatile and/or volatile memory, such as a random access memory (RAM), a read-only memory (ROM), an erasable programmable read-only memory (EPROM), or flash memory. Alternatively or in addition, the memory 214 may include an optical, magnetic (hard-drive) or any other form of data storage device.

The processor 212 may be in communication with the memory 214. The processor 212 may also be in communication with additional components, such as a display. The processor 212 may be a device or combination of devices that execute computer executable instructions stored in the memory 214 or other memories that implement the logic of the system 100 when executed by the processor 212. The computer executable instructions or computer code may be written in any computer language, such as C++, C#, Java, Pascal, Visual Basic, Perl, HyperText Markup Language (HTML), JavaScript, assembly language, shell script, or any combination thereof. The computer code may include source code and/or compiled code. Examples of the processor 212 include a general processor, a central processing unit, a server, an application specific integrated circuit (ASIC), a digital signal processor, a field programmable gate array (FPGA), a digital circuit, an analog circuit, or combinations thereof.

For example, the memory 214 may include modules, such as a sensor module 218, a light fixture module 220, a mobile communications module 222, a lighting effects module 224, and an auto-commission module 226. The memory 214 may also include data, data structures, or a combination thereof, used by the modules, such as the sensor data 228, the focus positions 230, the target locations 232, the fixture locations 234, the calibration table 236, scene information 244, presets 246, and target light characteristics 238, such as color 240 and intensity 242. Because the auto-commission device 102 may be implemented in many different ways, the memory 214 may include fewer, additional, or different modules. Similarly, the memory 214 may include fewer, additional, or different data or data structures.

The light fixture module 220 may communicate with the light fixtures 204. In one example, the light fixture module 220 may transmit adjustment instructions to the light fixtures 204 that adjust the positions of the light fixtures 204. The communication may be based on any suitable proprietary or standard communications protocol, such as Ethernet, TCP/IP (Transport Control/Internet Protocol), UDP (User Datagram Protocol), OSC (Open Sound Control), or DMX512, which is an industry standard communications protocol for digital communication networks developed by the Engineering Commission of United States Institute for Theatre Technology (USITT). In a second example, the light fixture module 220 may transmit adjustment instructions to the light fixtures 204 that adjust light characteristic of light generated by the light fixtures 204. The light fixture module 220 may also received information from the light fixtures 204, such as light fixture position information, diagnostic information, or any other type of information transmitted from the light fixtures 204.

The sensor module 218 may communicate with the sensors 206 and 208. For example, the sensor module 218 may receive the sensor data 228 from the sensors 206 and 208. The sensor data 228 may include the light level or any other light characteristic, such as color, detected at the sensors 206 and 208. The sensor module 218 may determine whether a sensor is a wireless sensor, such as the wireless sensor 208 illustrated in FIG. 2, and communicate with the sensor with the mobile communications module 222 if the sensor is wireless.

The mobile communications module 222 may turn the wireless communications unit 210 on or off depending on whether the auto-commission device 102 is actively communicating with any wireless sensors. When the wireless communications unit 210 is turned on, the wireless communications unit may be accessible from wireless devices, such as the wireless sensor 208.

During the operation of the system 100, the auto-commission module 226 may perform—in conjunction with the sensor module 218, the light fixture module 220 and the mobile communications module 222—the features of the auto-commission device 102 described above. For example, the auto-commission module 226 may receive the detected light levels or other light characteristics from the sensors 206 and 208 in the form of the sensor data 228. The auto-commission module 226 may determine the focus positions 230 by adjusting the positions of the light fixtures 204 through the light fixture module 220 and monitoring the sensor data 228. The auto-commission module 226 may populate the calibration table 236 from the focus positions 230 and the target locations 232. The auto-commission module 226 may compare the target light characteristics 238 with the light characteristics in the sensor data 228 received from the sensors 206 and 208. If the light characteristics in the sensor data 228 do not match the target light characteristics 238, then the auto-commission module 226 may transmit the adjust instructions to the light fixtures 204 directing the light fixtures 204 to adjust the emitted light accordingly. The auto-commission module 226 may extrapolate from data in the calibration table 236 in order to determine how to position the light fixture 104 so that the light fixture 204 focuses on any arbitrary location.

In addition, the auto-commission module 226 may determine the fixture locations 234 relative to the target locations 232 from data in the calibration table 236. Alternatively, the auto-commission module 226 may determine the target locations 232 relative to the fixture locations 234 from data in the calibration table 236. The target locations 232 and the fixture locations 234 may include coordinates in a spherical coordinate system, a polar coordinate system, a Cartesian coordinate system, or any other type of coordinate system. The target locations 232 and the fixture locations 234 may share a common coordinate system. Alternatively, the target locations 232 and the fixture locations 234 may each use a different coordinate system than the other.

The scene information 244 may include the target light characteristics 238 for one or more target locations over time. For example, in a theatrical performance, the position of the light fixtures 204, the intensity of the light, and the color of the light generated by each of the light fixtures 204 in one scene may be different than in another scene. The light intensity and/or color of the light may vary from one location to another within a single scene. Additionally, the position of the light fixtures 204, the intensity of the light, and the color of the light generated by each of the light fixtures 204 may vary within a single scene.

The lighting effects module 224 may control the positions of, and the characteristics of the light emitted from, the light fixtures 204. The lighting effects module 224 may control the positions of the light fixtures 204 and the characteristics of the emitted light in accordance with the scene information 244.

In one example, the lighting effects module 224 may receive the scene information 244 over the data network 202. A lighting design software package may export the scene information 244 so that the lighting effects module 224 may receive the scene information 244.

Alternatively or in addition, the lighting effects module 224 may record the scene information 244. The fixed sensors 204 may be imbedded in a theatrical set, or otherwise fixed into position, at the target locations 232. During a theatrical performance, for example, the auto-commission module 226 may receive the light characteristics detected at each of the target locations 232 over time. The auto-commission module 226 may store the received light characteristics as the target light characteristics 238 for the target locations 232 over time in the scene information 244. In one example, the auto-commission module 226 may receive light fixture position information from the light fixtures 204 or from another component that controls the light fixtures 204, and may store the light fixture position information over time in the scene information 244.

Subsequent to the recording, the lighting effects module 224 may control the positions of the light fixtures 204 and the characteristics of the emitted light in accordance with the scene information 244. As theatrical sets are moved from one venue to another, the ambient light affecting the lighting on the sets may change. Based on the sensor data 228 feedback received during playback of the scene information 244, the lighting effects module 224 may compensate for variances in the ambient light across different venues so that the lighting is the same regardless of the venue. Similarly, the lighting effects module 224 may compensate for other differences in lighting, such as one or more lamps failing, and objects or actors moving on a stage.

To playback the scene information 244, the lighting effects module 224 may read the scene information 244 that includes position and light characteristic information for the light fixtures 204 over time. The lighting effects module 224 may position the light fixtures 204 and set the light characteristics for the fixtures 204 over time as indicated in the scene information 244.

The locations and orientations of the light fixtures 204 with respect to the fixed sensors 206 or the theatrical sets as a whole may vary from venue to venue. As described above, the auto-commission module 226 may determine the locations of the light fixtures relative to the sensors 206 and 208. Additionally, the auto-commission module 226 may determine the focus positions 230. The auto-commission module 226 may therefore determine variations in the focus positions 230 and the locations of the light fixtures 204 across the venues. Based on the determined variations in locations and orientations of the light fixtures 204, the lighting effects module 224 may adjust the scene information 244 so that when the scene information 244 is played back, the lighting effects module 224 maintains the same lighting regardless of the venue. Alternatively or in addition, the lighting effects module 224 may adjust the position, light characteristics, or both during a performance based on the sensor data 228 received from the sensors 206 and 208. The lighting effects module 224 may adjust the light characteristics slowly enough that the changes are imperceptible by an audience.

The presets 246 may include special effects that may be applied to one or more light fixtures 204. For example, one special effect may include generation of light that has the appearance of being hot. Another special effect may be the generation of light that has the appearance of being cold. Yet another special effect may be generation of light that emulates sunlight during the course of a full day but which is condensed over a shortened period of time. Additional examples of special effects include scary lighting, ominous lighting, friendly lighting, transiting color schemes, fireworks, explosions, light generated in response to an audio signal or detected event, a reflection simulation such as a shimmering reflection off of water, and a motion simulation, where one or more areas of light move in a common direction across a plane to produce a sense of movement.

The lighting effects module 224 may control the light fixtures 204 so as to re-create the special effects in the presets 246. The lighting effects module 224 may use feedback from the sensors, 206 or 208, to maintain consistency of the special effects. An operator of the system 100 may direct the auto-commission device 102 to apply a selected special effect to one or more of the light fixtures 204. Additionally, the lighting effects module 224 may record one or more of the special effects in the presets 246.

The lighting effects module 224 may coordinate control of the light fixtures 204 to combine light beams generated by the light fixtures 204. In one example, the lighting effects module 224 may leverage multiple focus positions associated with a single target location. The multiple focus positions may provide the lighting effects module 224 with knowledge of the contours of the light beam generated by the light fixture 104. Thus, the lighting effects module 224 may direct multiple light fixtures 204 to focus on the target location 114 simultaneously. The lighting effects module 224 may offset the position the light fixtures 204 so that the beams only partially overlap, providing a wider illumination area than a single one of the light fixtures 204 provides.

The auto-commission device 102 may include a power device. A power device may provide a DC (direct current) power signal over multiple lines to multiple load devices. The load devices may include the light fixtures 204, the sensors 206, motors, display screens, or any other device that consumes electrical power, such as the wireless communications unit 210. The load devices may be powered by the DC power signal. Each one of the load devices may receive the DC power signal over a different one of the lines 108 than the other load devices. The DC power signal of one or more of the lines 108 may be used by multiple load devices. Alternatively or in addition, one of the load devices may be powered by two or more of the lines 108. The DC power signal may be pulse-width modulated (PWM) signal.

Each one of the load devices may include a load communicator. Alternatively or in addition, the load communicators may be electrically coupled to the lines 108 at or near the load devices. The load communicator may be any circuit that transmits data to or receives data from the power device via the same conductor or conductors that propagate the DC power signal over the line to the load device. For example, each one of the lines 108 may include two conductors that propagate the DC power signal to a corresponding one of the load devices. Two or more of the lines 108 may be included in a single cable. For example, a Category 5 cable may include four lines, where each one of the lines is twisted-pair wiring consisting of two conductors twisted together, for a total of eight conductors in the Category 5 cable. The load communicator may alter the impedance between the two conductors at the load end in order to transmit the data to the power device. Alternatively, the same category 5 cable may include seven lines, where seven of the eight conductors correspond to the lines 108 and the eighth conductor is a ground. Alternatively or in addition, each one of the lines 108 may include a single conductor.

The power device may determine a power level suitable for each of the load devices based on the data transmitted to the power device from the load communicators. For example, the power level may include a desired current level, a desired voltage level, a desired average power, or any combination thereof. The power device may adjust the power in the DC power signal on each one of the lines to match the power level that is suitable for each respective one of the load devices. For example, the power device may transmit more power to one of the light fixtures 204 than to one of the fixed sensors 206. To adjust the power in the DC power signal, the power device may alter the amplitude of the voltage of the DC power signal, the amplitude of the current of the DC power signal, the duty cycle of the DC power signal, or any combination thereof.

The load device may include a load communicator that is specific to the type of load device. For example, the load communicator may be a light adapter that is designed to work with the light fixture 104. Alternatively, the load communicator may be a sensor adapter that is designed to work with the photosensor 106.

Figure 3:
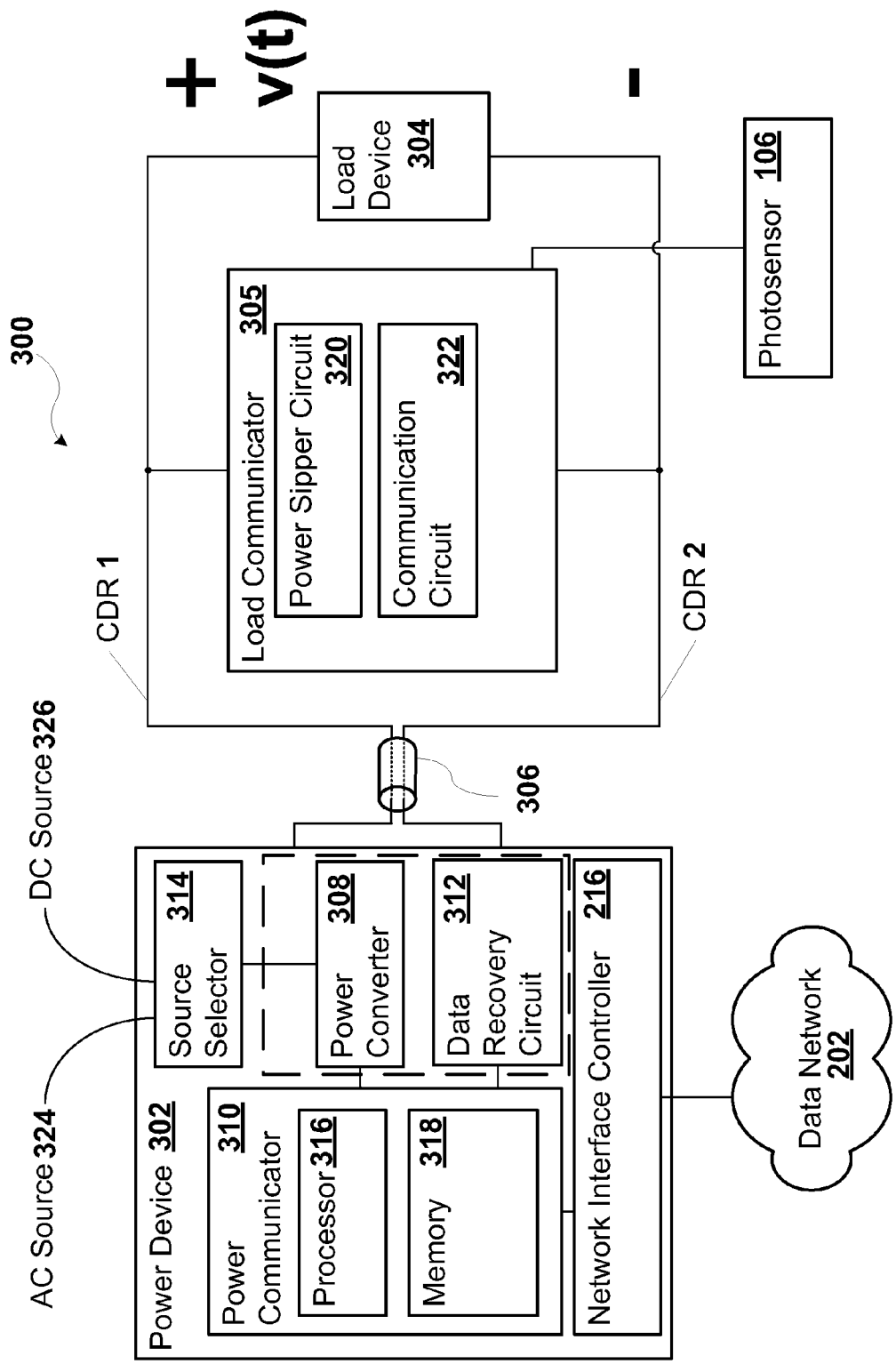
FIG. 3 illustrates a hardware diagram of an example system that uses a power device to power at least one load device, where the power device is the auto-commission device.

FIG. 3 illustrates a hardware diagram of an example system 300 that uses the power device 302 to power at least one load device 304, where the power device 302 is the auto-commission device 102. The power device 302 may both power the load device 304 and communicate with the load communicator 305 over a single line 306, such as one of the lines 108 illustrated in FIG. 1. The power device 302 may also power the load communicator 305 over the single line 306. The single line 306 illustrated in FIG. 3 includes two conductors, designated CDR 1 and CDR 2, respectively. The line 306 may be any suitable tangible medium that can propagate an electromagnetic signal. For example, the line 306 may be twisted pair wiring, Ethernet wiring, 10 AWG (American wire gauge) building wiring, or any other type of wiring comprising at least two conductors, or a loop. The length of the line 306 may be any suitable length.

The system 300 may include the load device 304, the load communicator 305, and the power device 302. The system 300 may include additional, fewer, or different components. In one example, the system 300 may include the wireless communications unit 210. In a second example, the system 300 may include only the power device 302.

The load device 304 is considered a load device because the load device 304 draws power from the power device 302. Consequently, the load device 304 may be a first load device and the load communicator 305 may be a second load device, as is illustrated in FIG. 3. The load communicator 305 is considered a load communicator because the load communicator 305 communicates with the power device 302 from the load device 304 or from nearby the load device 304. The communication between the power device 302 and the load communicator 305 may be unidirectional or bi-directional.

The power device 302 may be any device or combination of devices that provides power over one or two conductors, CDR 1 and CDR 2, and that communicates over the same conductors. The power device 302 may provide the power to the load device over the conductors, CDR 1 and CDR 2, as a DC (direct current) signal. In addition, the power device 302 may provide power and communicate over additional conductors included in the other lines 108, such as is illustrated in FIG. 1.

The power device 302 may control the amount of power delivered by the DC power signal through pulse-width modulation (PWM) of the signal, through amplitude modulation of the signal, or a combination thereof. PWM of the signal may include varying the duty cycle of the signal in order to vary the amount of power delivered. The duty cycle is the fraction of time that the signal is in an "active" state, which, for a periodic function, may be represented as:

$$\text{duty cycle } D = \tau/T$$

where $\tau$ is the duration that the function is in an active state and T is the period of the function. Alternatively or additionally, the power device 302 may vary the amplitude of the pulse-width modulated signal in order to change the average amount of power delivered to the load device while maintaining a constant duty cycle.

The power device 302 may generate any type of pulse-width modulated signal, such as a pulse wave, a square wave, or a rectangular wave. The signal may be considered in an active state when the voltage or the current of the signal exceeds a determined threshold. In one example, such as a rectangular wave, pulse-width modulation may be provided where the duty cycle is different than ½ or 0.5.

The power device 302 may transmit data to the load device 304 using frequency modulation of the pulse-width modulated signal while maintaining a constant duty cycle. By maintaining the constant duty cycle, the power device 302 may continue to deliver a constant average amount of power to the load device 304. For example, the power device 302 may generate n alternate waveforms, where each one of the wave forms has the same duty cycle, but each one of the waveforms has different frequencies. Each one of the alternate waveforms may represent one of n possible states to transmit over the line. Alternatively or in addition, different methods of transmitting data to the load communicator 305 may be used.

The power device 302 may include a power converter 308, a power communicator 310, a data recovery circuit 312, and the network interface controller 216. The power device 302 may include additional, fewer, or different components. In one example, the power device 302 may not include the network interface controller 216. In a second example, the power device 302 may include a source selector 314. In a third example, the power device 302 may include multiple power converters 308, one for each one of the lines 108.

The power converter 308 may include any circuit that generates the DC power signal over the conductors, CDR 1 and CDR 2, in order to power the load device 304. Examples of the power converter 308 include a switched-mode power supply, an AC to DC (Alternating Current to Direct Current) converter, a DC to DC (Direct Current to Direct Current) converter, a fixed-frequency PWM converter, a variable-frequency quasi-resonant ZCS/ZVS (zero-current switching/zero-voltage switching) converter, a voltage converter, a current converter, a hysteretic converter, a PWM buck converter, and any other suitable power source.

The power communicator 310 may be any circuit, device, or combination of devices that controls the DC power signal generated by the power converter 308 in order to transmit data over the line 306. Alternatively or in addition, the power communicator 310 may be any circuit, device, or combination of devices that receives data from the line 306. The power communicator 310 may receive the data from the line 306 through the data recovery circuit 312. The power communicator 310 may communicate over the data network 202 via the network interface controller 216. In one example, the power communicator 310 may additionally control the DC power signal generated by the power converter 308 in order to control the amount of power delivered to the load device 304.

The power communicator 310 may include a processor 316 and a memory 318. The processor 316 may be in communication with the memory 318. The processor 316 may be in communication with other components, such as the power converter 308, the data recovery circuit 312, and the network interface controller 216.

The memory 318 may be any now known, or later discovered, data storage device, component or combination thereof. The memory 318 may include non-volatile and/or volatile memory, such as a random access memory (RAM), a read-only memory (ROM), an erasable programmable read-only memory (EPROM), flash memory, or any other type of electronic storage component. Alternatively or in addition, the memory 318 may include an optical, magnetic (hard-drive) or any other form of data storage device.

The processor 316 may be a general processor, central processing unit, server, application specific integrated circuit (ASIC), digital signal processor, field programmable gate array (FPGA), digital circuit, analog circuit, or any combinations thereof. The processor 316 may be operable to execute computer executable instructions or computer code embodied in the memory 318 or in other memory to implement the functionality of the power communicator 310. The computer code may include instructions executable with the processor 316. The computer code may be written in any computer language now known or later discovered, such as C++, C#, Java, Pascal, Visual Basic, Perl, HyperText Markup Language (HTML), JavaScript, assembly language, and any combination thereof. In one example, the memory 318 may include an operating system, such as LINUX®, a registered trademark of individual, William Croce of Boston, Mass.

The source selector 314 may be any circuit that may selectively distribute power from two or more power sources, such as an AC source 324 and a DC source 326, to one or more power converters 308. The source selector 314 may include, for example, a relay, a power transistor, a TRIAC (triode for alternating current), and/or a SCR (silicon-controlled rectifier) for selectively distributing the power from two or more power sources 324 and 326.

The data recovery circuit 312 may be any circuit that facilitates extracting data received from the line 306. The data recovery circuit 312 may recover all or a portion of a data signal transmitted from the load communicator 305 over the line 306.

The load communicator 305 may be any circuit, device, or combination of devices that transmits and receives data over the line 306. The load communicator 305 may include a power sipper circuit 320 and a communication circuit 322. The load communicator 305 may include additional, fewer, or different components. For example, the load communicator 305 may not include the power sipper circuit 320.

The power sipper circuit 320 may be any circuit configured to store power received on the line 306 so as to generate a regulated DC power signal that powers the communication circuit 322, any other suitable device, or any combination thereof. The power sipper circuit 320 may include, for example, a linear regulator or a switching regulator.

The communication circuit 322 may be any circuit that sends and receives information over the line 306. The communication circuit 322 may include a processor and a memory, such as the processor 316 and the memory 318 included in the power communicator 310, but where the processor executes computer instructions or computer code embodied in the memory to implement the functionality of the communication circuit 322.

During operation of the system 300, the communication circuit 322 may transmit data to the power device 302 using any number of possible communication techniques. In one example, the communication circuit 322 may alter the impedance between the two conductors, CDR 1 and CDR 2. To do so, the communication circuit 322 may connect or disconnect a component between the conductors, CDR 1 and CDR 2, thereby altering the impedance on line 306. The data recovery circuit 312 of the power device 302 may detect the altered impedance by detecting a change in an operating frequency of the power converter 308, if the power converter 308 includes a hysteretic controller. The operating frequency is the frequency of a signal internal to the power converter 308 that is filtered to produce the DC power signal on the line 306 when DC power signal is active. For example, the signal internal to the power converter 308 may be filtered with a filter comprising an inductor and a capacitor. The communication between the power device 302 and the communication circuit 322 may be the same as the communication between a control device and a communication circuit described in U.S. patent application Ser. No. 12/389,868, entitled "TRANSMISSION OF POWER AND DATA WITH FREQUENCY MODULATION," filed Feb. 20, 2009, the entire contents of which are hereby incorporated herein by reference. Thus, the communication circuit 322 may transmit data to the power device 302 by altering the impedance on the line 306.

In a second example, the communication circuit 322 may alter the resistance in the electrical path between the two conductors, CDR 1 and CDR 2, by connecting or disconnecting a component between the conductors. If the power converter 308 is a current source, altering the resistance results in a change in the voltage, v(t), on the line 306. The data recovery circuit 312 may detect changes in the voltage, v(t), on the line 306, by comparing the line voltage, v(t), to a reference voltage. If the voltage, v(t), on the line 306 is above the reference voltage, then the data recovery circuit 312 may determine that the communication circuit 322 in the load communicator 305 has increased the resistance on the line 306. The communication between the power device 302 and the load communicator 305 may be the same as the communication between a control system and the load communicator described in U.S. patent application Ser. No. 12/536,231, entitled "DIGITAL SWITCH COMMUNICATION," filed Aug. 5, 2009, the entire contents of which are hereby incorporated herein by reference. Thus, the communication circuit 322 may transmit data to the power device 302 by switching a resistive element in and out of the electrical path between the two conductors, CDR 1 and CDR 2.

In a third example, the communication circuit 322 may short the two conductors, CDR 1 and CDR 2, during a discharge cycle of the DC power signal on the line 306 if the load device 304 includes a LED or any other diode that has a diode forward voltage drop, $V_d$. Each period of the DC power signal may include a charge cycle and a discharge cycle. During the charge cycle, the power device 302 is active and charges the line 306. During the discharge cycle, the power device 302 is inactive, and does not charge or discharge the line. If the voltage, v(t), on the line 306 when the discharge cycle begins is greater than the total diode forward voltage drop, $V_d$, of the LED, then the voltage, v(t), on the line 306 almost immediately drops to $V_d$. During the rest of the discharge cycle, the voltage on the line 306 decreases at a rate determined by parasitic electrical losses in the power device 302, the line 306, the load communicator 305, and the load device 304. If the voltage on the line 306 when the discharge cycle begins is less than or equal to the total diode forward voltage drop, $V_d$, then the voltage on the line 306 may simply decrease at a rate determined by parasitic electrical losses during the discharge cycle. Consequently, the line 306 may not fully discharge before the next charge cycle begins. However, if the communication circuit 322 shorts the two conductors, CDR 1 and CDR 2, during the discharge cycle, then the voltage, v(t), on the line 306 may drop suddenly to zero. The data recovery circuit 312 in the power device 302 may compare the voltage, v(t), on the line 306 with a calibrated reference voltage at a particular point in time during the discharge cycle. If the voltage on the line 306 is below the calibrated reference voltage, then the data recovery circuit 312 may detect the communication circuit 322 shorting the line 306. Alternatively, if the voltage on the line 306 is above the calibrated reference voltage, then the data recovery circuit 312 may determine that the communication circuit 322 did not short the line 306. The communication between the power device 302 and the load communicator 305 may be the same as the communication between the power device and the load communicator described in U.S. patent application Ser. No. 12/465,800, entitled "DISCHARGE CYCLE COMMUNICATION," filed May 14, 2009, the entire contents of which are hereby incorporated herein by reference. Thus, the communication circuit 322 may transmit data to the power device 302 by shorting the two conductors, CDR 1 and CDR 2 during the discharge cycle if the load device 304 includes a LED or any other diode that has a diode forward voltage drop, $V_d$.

As discussed above, the communication circuit 322 may transmit data to the power device 302 using any number of possible communication techniques. As also discussed above, the power device 302 may transmit data to the communication circuit 322 using frequency modulation of the pulse-width modulated signal. In one example, the power device 302 and the communication circuit 322 may include a communication protocol module executable with a processor, such as the processor 316 in the power device 302. The communication protocol module may implement the logic of any communication protocol now known or later discovered. The communication protocol module may be layered above and transmit and receive data using any of the suitable techniques described above. Accordingly, software stored in the memory 318 of the power device 302 and in memory of the load communicator 305 may communicate with each other by invoking programmatic functions implemented in the communication protocol modules. Examples of the communication protocol include TCP/IP (transport control protocol/Internet Protocol), RS-232 (Recommended Standard 232), USB (Universal Serial Bus) or any other type of communication protocol.

In one example, the communication protocol may be a simple protocol that facilitates transmission and receipt of symbols. Each symbol may be represented by a fixed number of bits, such as 8 or 16 bits. An escape sequence may be a predefined sequence of symbols. In one embodiment, a notice of a hardware interrupt generated at the load communicator 305 may be communicated to the power device 302 by transmitting a particular escape sequence that corresponds to the hardware interrupt from the load communicator 305 to the power device 302. The power device 302 may detect the particular escape sequence in a stream of symbols received from the load communicator 305 and, accordingly, handle the interrupt. The power device 302 may, for example, transmit an acknowledgement escape sequence to the load communicator 305 to indicate that the interrupt is handled.

The load communicator 305, the load device 304, or any combination thereof may also communicate with additional devices. In one example, the load communicator 305 may communicate with one or more sensors, such as the photosensor 106, while the load device 304 is the light fixture 104. The photosensor 106 may be electrically coupled to the load communicator 305. The load communicator 305 may process sensor signals received from the photosensor 106. In one example, the load communicator 305 may transmit data based on the sensor signals to the power device 302. In a second example, the load communicator 305 may communicate with the load device 304. For example, the load communicator 305, such as the light adapter, may be wired to the light fixture 104. The light fixture 104 may include a circuit board on which LEDs are mounted. The circuit board may include a component that communicates with the load communicator 305 in order to identify, for example, the light fixture 104 to the load communicator 305.

Figure 4:
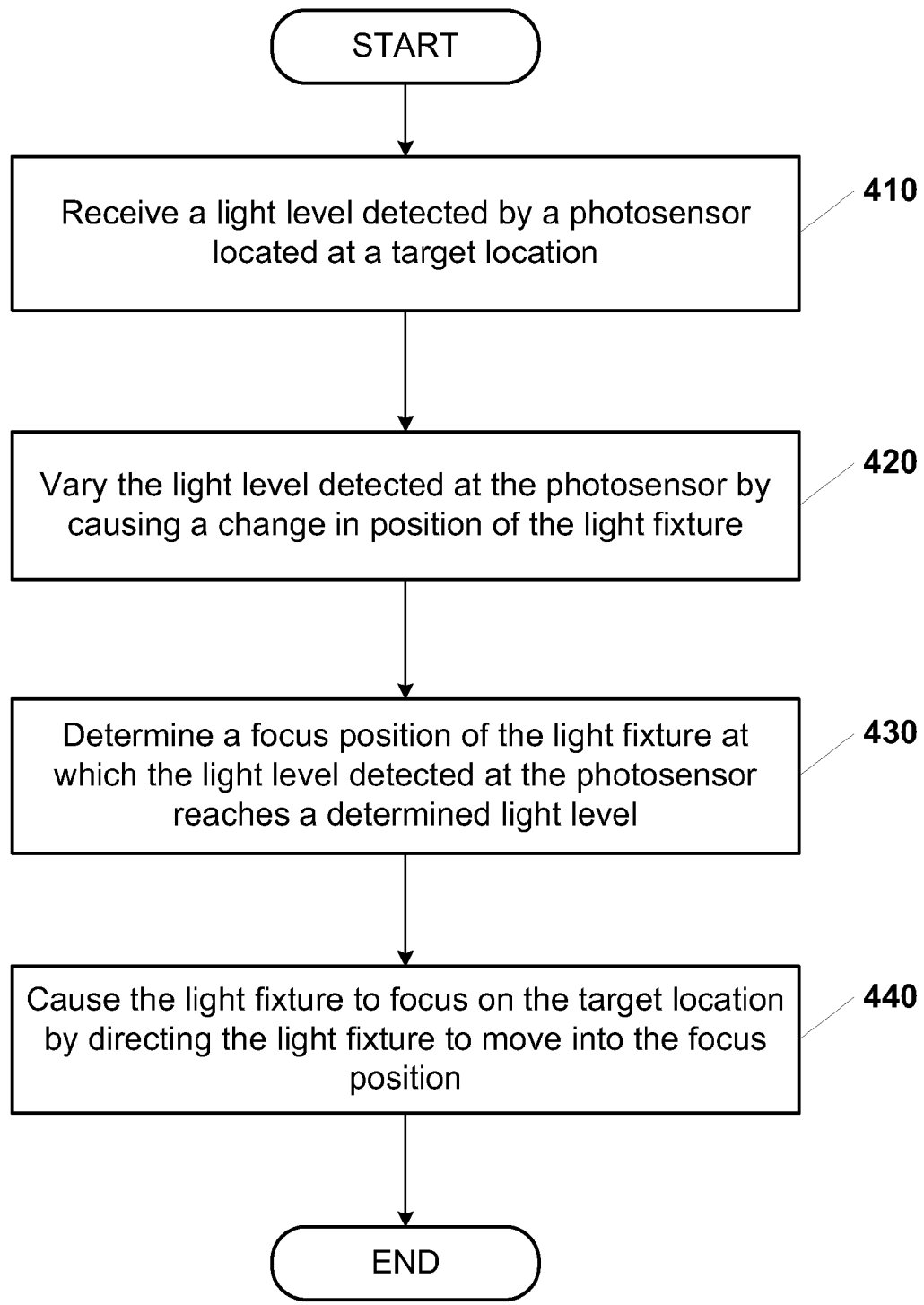
FIG. 4 illustrates a flow diagram of a first example of the logic of the system.

FIG. 4 illustrates a flow diagram of a first example of the logic of the system 100 or 300. The logic may include additional, different, or fewer operations. The operations may be executed in a different order than illustrated in FIG. 4.

The operation may begin by receiving a light level detected by the photosensor 106 at the target location 114 (410). The light level detected by the photosensor 106 may be varied by causing a change in position of the light fixture 104 (420). A focus position 116 of the light fixture 104 at which the light level detected at the photosensor reaches the determined light level may be determined (430).

The light fixture 104 may be focused on the target location 114 by directing the light fixture 104 to move into the focus position 116 (440). The operation may end by, for example, by adjusting the color of light emitted by the light fixture 104 until the color of light received at the photosensor 106 matches a target color 240.

Figure 5:
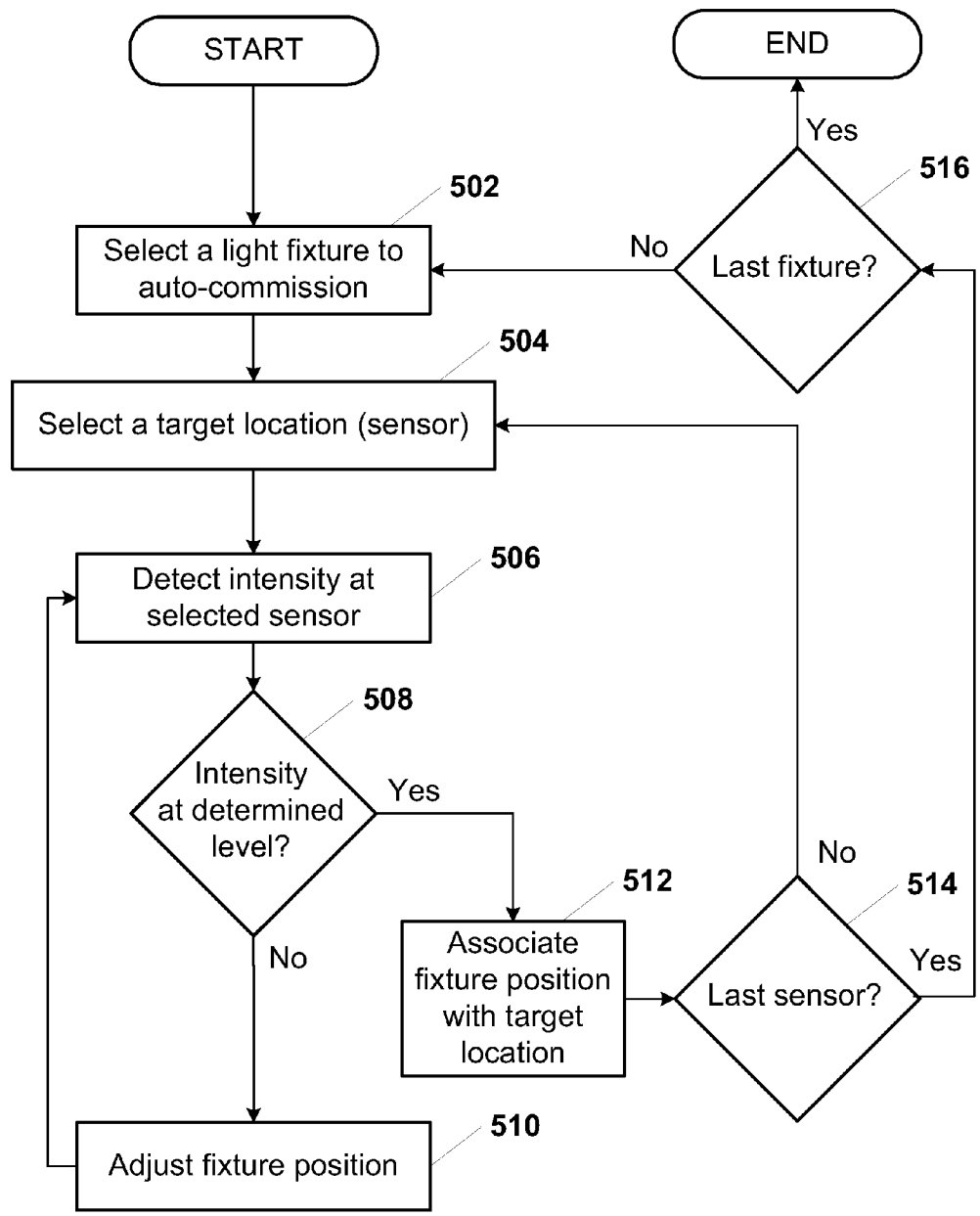
FIG. 5 illustrates a flow diagram of a second example of the logic of the system.

FIG. 5 illustrates a flow diagram of a second example of the logic of the system 100 or 300. The logic may include additional, different, or fewer operations. The operations may be executed in a different order than illustrated in FIG. 5.

The operation may begin by selecting one of the light fixtures 204 to auto-commission (502). In one example, the auto-commission device 102 may first select a subset of the light fixtures 204 to auto-commission and then individually select each light fixture in the subset of the light fixtures 204 to auto-commission. Alternatively, the auto-commission device 102 may receive a user input selection of the selected light fixture, such as from an application running on a smart phone.

The auto-commission device 102 may select the target location 114 (504). For example, the auto-commission device 102 may select the location of one of the fixed sensors 206 as the target location 114. The photosensor 106 may detect the light intensity received at the target location 114 (506).

The auto-commission device 102 may determine whether the light intensity received at the target location 114 reaches the determined light level (508). If not, then the auto-commission device 102 may adjust the position of the selected light fixture (510) and return to the operation of detecting the light intensity received at the target location 114 (506).

Alternatively, if the auto-commission device 102 determines that the light intensity exceeds the determined light level and the position of the selected light fixture is, therefore, the focus position 116, then the auto-commission device 102 may associate the focus position 116 with the target location 114 (512). The operation may continue with the auto-commission device 102 determining whether the selected target location is the last target location for the selected light fixture or not (514). For example, the auto-commission device 102 may focus the selected light fixture on multiple sensors 206 and 208, each at different target locations, before selecting another light fixture to auto-commission.

If there are additional target locations for the selected light fixture, then the operation may return to selecting the target location 114 (504). Alternatively, if there are no more target locations to process, then the operation may continue on by determining whether there are any more light fixtures 204 to auto-commission (516).

If there are more light fixtures 204 to auto-commission, then the operation may return to selecting one of the light fixtures 204 to auto-commission (502). Otherwise, the operation may end, for example, by controlling the light fixtures 204 to illuminate the target locations 232 with the target light characteristics 238 as indicated in the scene information 244.

Figure 6:
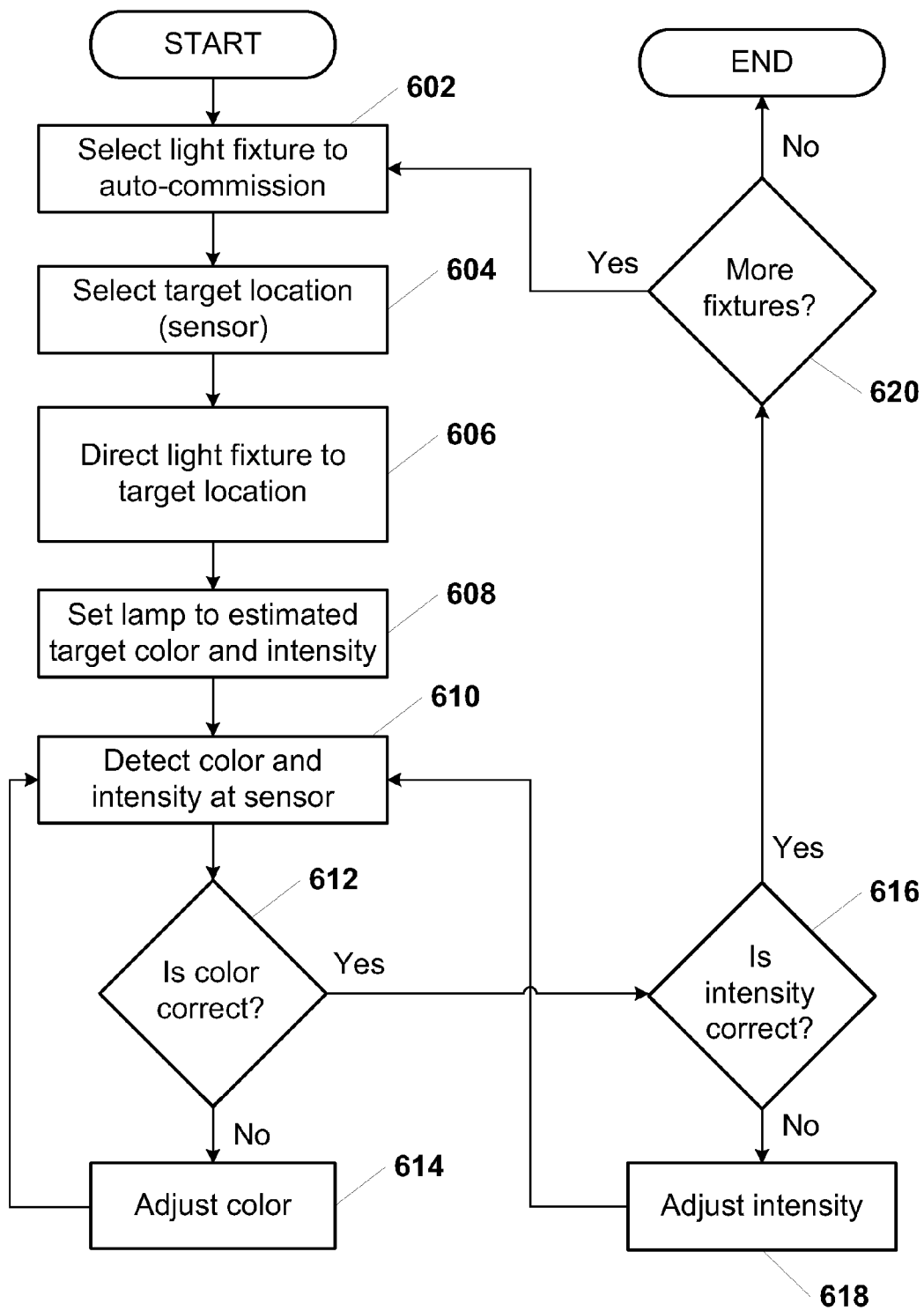
FIG. 6 illustrates a flow diagram of a third example of the logic of the system.

FIG. 6 illustrates a flow diagram of a third example of the logic of the system 100 or 300. The logic may include additional, different, or fewer operations. The operations may be executed in a different order than illustrated in FIG. 6.

The operation may begin by the auto-commission device 102 selecting one of the light fixtures 204 to auto-commission (602). In one example, the auto-commission device 102 may first select a subset of the light fixtures 204 to auto-commission and then individually select each light fixture in the subset of the light fixtures 204 to auto-commission. The operation may continue with the auto-commission device 102 selecting the target location 114 (604). The auto-commission device 102 may direct the selected light fixture to focus on the target location 114 (606).

The operation may continue by the auto-commission device 102 causing the light fixture 104 to generate light having the target color 240 and the target intensity 242 (608). The auto-commission device 102 may receive a detected color and detected intensity from the photosensor 106 located at the target location 114 (610). The auto-commission device 102 may check whether the detected color matches the target color 240 (612) If the detected color does not match the target color 240, then the operation may continue with the auto-commission device 102 adjusting the color of the light emitted by the light fixture 104 to better match the target color 240 (614). The operation may then return to the operation of the auto-commission device 102 receiving a detected color and detected intensity from the photosensor 106 located at the target location 114 (610).

Otherwise, if the detected color does match the target color 240, then the operation may continue by checking whether the detected intensity matches the target intensity 242 (616). If the detected intensity fails to match the target intensity 242, then the auto-commission device 102 may adjust the intensity of the light (618). The operation may then return to the auto-commission device 102 receiving the detected color and the detected intensity from the photosensor 106 (610).

Otherwise, if the detected intensity correctly matches the target intensity 242, then the operation may proceed by checking whether there are any more light fixtures 204 to auto-commission (620). Alternatively or in addition, the operation may proceed by focusing the selected light fixture on one or more additional target locations and repeat checking the target color 240 and the target intensity 242. If there are more light fixtures 204 to auto-commission, then the operation may return to selecting one of the light fixtures 204 to auto-commission (602). Otherwise, the operation may end by, for example, controlling the light fixtures 204 to illuminate the target locations 232 with the target light characteristics 238 as indicated in the scene information 244.

The systems 100 and 300 may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. Any modules, such as the sensor module 218, the light fixture module 220, the mobile communications module 222, the auto-commission module 226, and the lighting effects module 224, may be implemented partially or entirely in hardware, such as a digital or analog circuit, instead of computer-executable instructions stored in the memory 214.

The processing capability of the systems 100 and 300 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system 100 or 300.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or nonvolatile memory such as ROM and RAM, or any other suitable storage device. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A system for auto-commissioning a light fixture, the system comprising:
a photosensor positioned at a target location that receives light generated by the light fixture;
a sensor module that receives a light level detected at the photosensor;
a light fixture module that causes a variation in a position of the light fixture; and
an auto-commission module in communication with the sensor module and the light fixture module that determines a focus position of the light fixture at which the light level detected at the photosensor reaches a determined level, wherein the auto-commission module associates the focus position of the light fixture with the target location in a calibration table.

2. The system of claim 1 further comprising a lighting effects module that determines a position of the light fixture at which the light fixture focuses on at least one location different from the target position based on the focus position being associated with the target location in the calibration table.

3. The system of claim 1 further comprising a lighting effects module that adjusts the color of light emitted from the light fixture until the photosensor detects a target color at the target location.

4. The system of claim 3 wherein the lighting effects module receives the target color from sensor data generated by the photosensor in response to receipt by the photosensor of light reflected off of a color swatch colored with the target color.

5. The system of claim 1 further comprising a lighting effects module that adjusts the intensity of light emitted from the light fixture until the photosensor detects a target intensity at the target location.

6. The system of claim 1 wherein the auto-commission module determines a location of the light fixture relative to the target location from the calibration table.

7. The system of claim 1 wherein the determined light level is a maximum light level over the variation in the position of the light fixture.

8. A tangible non-transitory computer-readable medium encoded with computer executable instructions, the computer executable instructions executable with a processor, the computer-readable medium comprising:
a sensor module executable with the processor to receive a light level detected at a plurality of photosensors located at a plurality of target locations;
a light fixture module executable with the processor to selectively cause a variation in position of each one of the light fixtures; and an auto-commission module in communication with the sensor module and the light fixture module, the auto-commission module executable with the processor to determine a focus position for each one of the light fixtures based on a determination that a determined light level is detected at each one of the photosensors.

9. The tangible non-transitory computer-readable medium of claim 8 further comprising a lighting effects module executable with the processor to position the light fixtures for stage lighting based on an association in a calibration table between the focus position for each one of the light fixtures and a corresponding one of the target locations.

10. The tangible non-transitory computer-readable medium of claim 8 further comprising a lighting effects module executable with the processor to cause generation of light from the light fixtures such that the light detected at each one of the photosensors has a target light characteristic.

11. The tangible non-transitory computer-readable medium of claim 10, wherein the target light characteristic includes a target color.

12. The tangible non-transitory computer-readable medium of claim 10, wherein the target light characteristic includes a target intensity.

13. The tangible non-transitory computer-readable medium of claim 8 further comprising a lighting effects module executable to record lighting characteristics detected at the photosensors in scene information.

14. The tangible non-transitory computer-readable medium of claim 13, wherein the lighting effects module is further executable to direct the light fixtures to regenerate light having the lighting characteristics detected at the photosensors and stored in the scene information.

15. A computer-implemented method for auto-commissioning a light fixture, the method comprising:

receiving, with a processor, a light level detected at a photosensor, wherein the photosensor is located at a target location;
varying the light level detected at the photosensor by causing a change in position of the light fixture with the processor;
determining, with the processor, a focus position of the light fixture at which the light level detected at the photosensor reaches a determined light level; and
causing the light fixture to focus on the target location by directing the light fixture to move into the focus position with the processor.

16. The method of claim 15 further comprising:
receiving sensor data from the photosensor that includes a detected light characteristic of light received at the photosensor; and
adjusting, with the processor, the light emitted by the light fixture until the detected light characteristic matches a target light characteristic.

17. The method of claim 16, wherein the target light characteristic includes a target color.

18. The method of claim 15, wherein causing the change in position of the light fixture comprises causing the light fixture to sweep through a full range of motion of the light fixture.

19. The method of claim 15 further comprising adjusting, with the processor, the color of light emitted by the light fixture until the color of light received at the photosensor matches a target color in response to a change in light received at the photosensor caused by a light reflecting object in proximity with the photosensor.

20. The method of claim 15 further comprising altering the color of light emitted from the light fixture to match a target color that varies over time, wherein information about how the target color varies over time is stored in memory as a preset.

* * * * *